Oct. 13, 1964 H. E. CRINER 3,152,476
PRESSURE SENSING DEVICE
Filed May 1, 1961
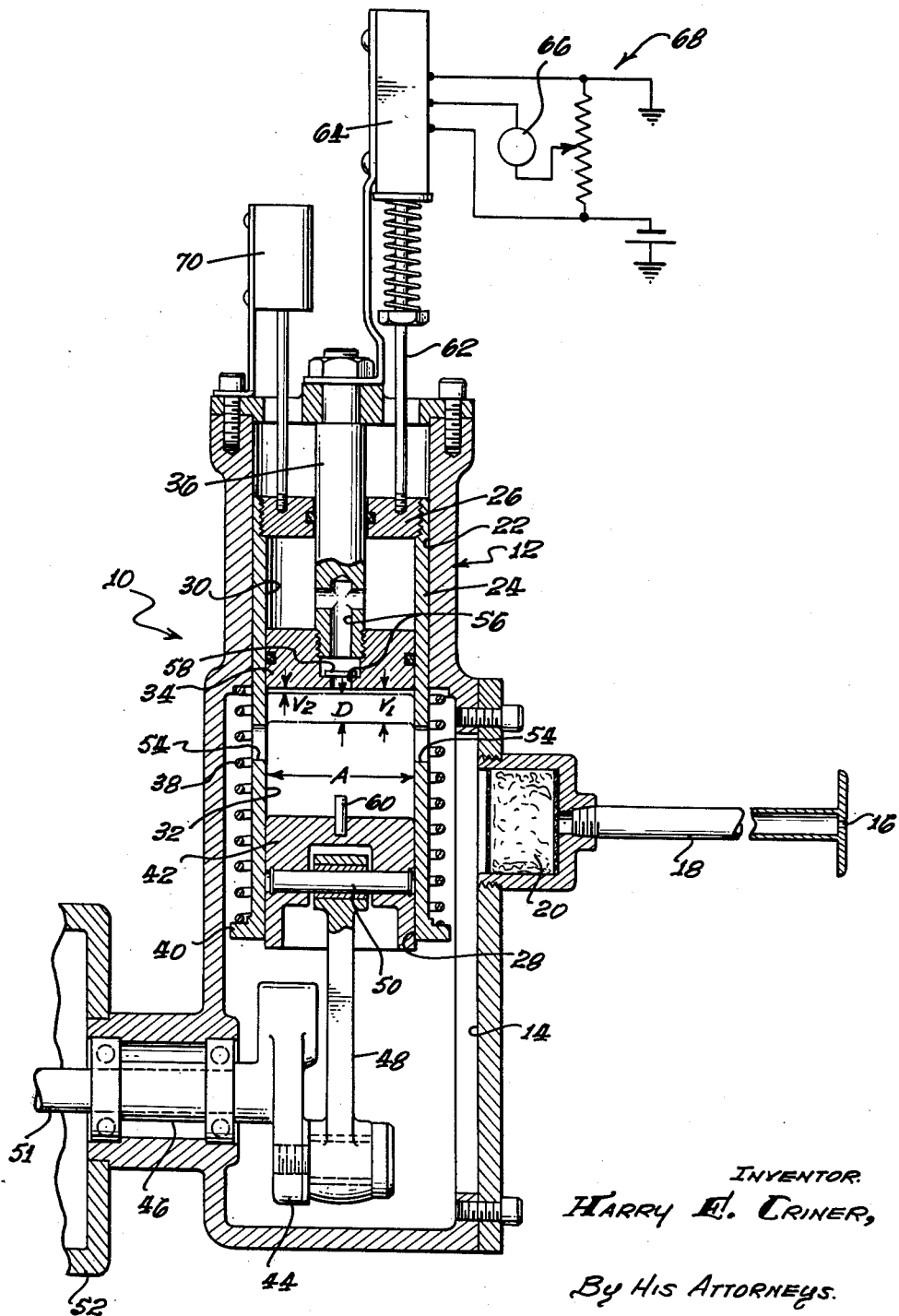
INVENTOR.
HARRY E. CRINER,
By His Attorneys.
HARRIS, KIECH, RUSSELL & KERN.

United States Patent Office 3,152,476
Patented Oct. 13, 1964

3,152,476
PRESSURE SENSING DEVICE
Harry E. Criner, Sierra Madre, Calif., assignor to Ford Motor Company, Dearborn, Mich., a corporation of Delaware
Filed May 1, 1961, Ser. No. 106,567
13 Claims. (Cl. 73—388)

The present invention relates in general to a pressure sensing and/or measuring device and, more particularly, to an apparatus for sensing low gas pressures, such as the low atmospheric pressures encountered at high altitudes, a general object of the invention being to provide an apparatus which accurately amplifies or magnifies such low pressures to sensible values.

The invention has utility wherever sensing of low pressures is required. For example, it may be used for, but is not limited to, measuring pressure altitude at high altitudes. In this case, the invention may provide an output indication in terms of altitude in any desired units, such as thousands of feet.

A primary object of the invention is to provide a low pressure sensing device having means, including pumping means, for increasing the pressure of the gas asymptotically to a higher equilibrium pressure, and provided with means for sensing such equilibrium pressure.

More particularly, a primary object of the invention is to provide means, including variable displacement pumping means, for asymptotically increasing the pressure of the gas to the higher equilibrium pressure incrementally by progressively smaller increments.

Still more specifically, the invention contemplates, and an important object thereof is to provide, a low pressure sensing device which includes: means providing a chamber the volume of which varies as a function of the pressure therein; variable displacement pumping means for pumping the gas into the chamber so as to progressively increase the volume thereof; means for progressively reducing the displacement of the pumping means as a function of the increasing volume of the chamber until an equilibrium pressure is attained in the chamber; and means for sensing the volume of the chamber.

Other objects of the invention are to provide a low pressure sensing device which includes: a housing; a cylinder movable in the housing in the direction of its axis, the cylinder being closed at one end; a stationary partition in the cylinder and connected to the housing, the cylinder providing between the closed end thereof and the partition a chamber the volume of which increases in response to movement of the closed end of the cylinder in a direction away from the partition; yieldable means for biasing the cylinder in the opposite direction so as to resist increasing the volume of the chamber; a piston axially reciprocable in the cylinder on the opposite side of the partition from the chamber; means for axially reciprocating the piston in the cylinder through a stroke of constant length; inlet port means in the cylinder on the side of said partition opposite the chamber and adapted to be covered by the piston as it approaches the partition; outlet port means connecting the chamber to the cylinder on the opposite side of the partition from the chamber; check valve means in the outlet port means and opening into the chamber; and means for sensing the axial position of the cylinder.

With the foregoing construction, the cylinder moves axially, with consequent movement of the inlet port means closer to the end of the working stroke of the piston to reduce the piston displacement, until the pressure in the chamber mentioned attains equilibrium with the pressure produced by the piston. The axial position of the cylinder at equilibrium is thus a measure of the low pressure being sensed, and the axial position of the cylinder may be exhibited in terms of pressure with any suitable indicia.

As will become apparent, the axial position of the cylinder is a function only of certain mechanical constants of the structure and the pressure being sensed. The effects of such factors as temperature, mechanical stress, and the like, are cancelled out, which is an important feature.

The foregoing objects, advantages, features and results of the present invention, together with various other objects, advantages, features and results thereof which will be specifically set forth hereinafter, or which will be evident to those skilled in the pressure sensing art in the light of this disclosure, may be achieved with the exemplary embodiment of the invention described in detail hereinafter and illustrated in the accompanying drawing.

Referring to the drawing, the pressure sensing device of the invention is designated generally by the numeral 10 and is shown as including a frame having the form of a housing 12, the latter providing a relatively large static pressure chamber 14 illustrated as communicating with a static pressure port 16 through a static pressure line 18 and a filter 20 for removing impurities from the gas whose pressure is to be measured. It will be understood that the static pressure port 16 is exposed to the gas whose pressure is to be measured. For example, the static pressure port 16 may be located at any suitable external point on an aircraft in the event that the pressure sensing device 10 is to be used to sense atmospheric pressure.

Axially reciprocable in a bore 22 in the housing 12 is a cylinder 24 having a closed end 26 and an open end 28. The cylinder 24 projects from the bore 22 into the static pressure chamber 14 and the open end 28 of the cylinder is in communication with the static pressure chamber.

The cylinder 24 is divided into two chambers 30 and 32 by a stationary partition 34 in a fluid tight manner. The partition 34 is suitably connected to the housing 12, as by an axial supporting rod 36 which extends through the closed end 26 of the cylinder, also in a fluid tight manner.

The chamber 30 is located between the closed end 26 of the cylinder 24 and the partition 34 and it will be apparent that if the gas whose pressure is to be sensed is pumped from the static pressure chamber 14 into the chamber 30 as will be described, the resulting pressure increase in the chamber 30 produces axial displacement of the cylinder in a direction to move the closed end thereof away from the partition. Such axial movement of the cylinder 24 is yieldably and resiliently resisted by a compression spring 38 which encircles the end of the cylinder that projects into the static pressure chamber 14. The spring 38 is seated at one end against the housing 12 and at its other end against an external annular flange 40 on the cylinder 24 adjacent the open end 28 thereof.

The aforementioned pumping of the gas whose pressure is to be measured into the chamber 30 is produced by a variable displacement pumping means which includes a piston 42 axially reciprocable in the cylinder 24 on the opposite side of the partition 34 from the closed end 26 of the cylinder. In other words, the piston 42 is axially reciprocable in the chamber 32. The pressure sensing device 10 includes means for reciprocating the piston 42, such means being shown as including a crank 44 located within the static pressure chamber 14 and carried by a crankshaft 46 and connected to the piston by a conventional connecting rod 48 and wrist pin 50. A drive shaft 51 for the crankshaft 46 extends to the exterior of the housing 12 and may be driven by any suitable motor, such as an electric motor, contained within a motor housing 52.

The variable displacement pumping means incorporated in the pressure sensing device 10 includes inlet port means 54, shown as comprising two inlet ports, formed in the cylinder 24 between the open end 28 thereof and the partition 34 and establishing communication between the static pressure chamber 14 and the chamber 32 within the cylinder. The pumping means also includes an outlet port means 56, shown as formed in the partition 34 and its supporting rod 36, for connecting the chamber 32 within the cylinder 24 to the chamber 30 therewithin. Within the outlet port means 56 is a check valve means 58, shown as a simple flap valve, opening inwardly into the chamber 30 so as to admit thereinto gas displaced from the chamber 32 by the piston 42. Preferably, the check valve means 58 is mechanically opened by an axial pin 60 on the piston 42 as the piston approaches the end of its working stroke.

Considering the operation of the pressure sensing device 10 as thus far described, it will be assumed that the piston 42 is initially in its most remote position from the partition 34, i.e., the piston is at bottom dead center. As the crank 44 starts to move the piston 42 toward the partition 34 to begin the working stroke of the piston, the gas in the chamber 32 between the piston and the partition is merely displaced outwardly into the static pressure chamber 14 through the inlet port means 54, the ports forming the inlet port means being relatively large to permit such flow without any significant rise in the pressure in the chamber 32. It will be noted that under these conditions, there is no flow through the static pressure line 18 in either direction since there is no net displacement in the static pressure chamber 14. In other words, the gas displaced from the cylinder chamber 32 merely results in corresponding displacement into the open end 28 of the cylinder 24 as the piston moves away from bottom dead center.

As the piston 42 continues its working stroke, it eventually covers and closes the inlet port means 54 thereupon trapping in the cylinder chamber 32 a value of gas which is designated in the drawing as $V_1$. By the time the piston 42 reaches the end of its working stroke and achieves its closest approach to the partition 34, i.e., by the time that the piston reaches top dead center, the volume of gas $V_1$ is compressed to a volume designated in the drawing as $V_2$, with a proportional pressure increase.

As the piston 42 approaches the end of its working stroke, the pin 60 thereon opens the check valve means 58 so that the gas compressed by the piston can escape from the cylinder chamber 32 into the cylinder chamber 30.

As soon as the piston 42 arrives at the end of its working stroke, it moves away from its top dead center position to begin its return stroke, whereupon the check valve means 58 closes to trap the gas at the increased pressure within the cylinder chamber 30. Ultimately, the piston 42 completes its return stroke and arrives at its bottom dead center position, whereupon the foregoing cycle is repeated.

It will be noted that as the pressure in the cylinder chamber 30 is increased in the foregoing manner, the cylinder 24 moves axially, in opposition to the action of the spring 38, in a direction to increase the volume of the cylinder chamber 30. This has the effect of moving the inlet port means 54 in the cylinder 24 toward the partition 34. Consequently, since the length of the stroke of the piston 42 is fixed by the crank 44, the next working stroke of the piston will result in less compression of the gas in the cylinder chamber 32, since $V_1$ will be smaller. Consequently, the next pressure increase, and corresponding volume increase, in the cylinder chamber 30 will be smaller.

Thus, during successive cycles, the successive pressure increases in the cylinder chamber 30, and the resulting successive increases in the volume of this chamber due to axial displacement of the cylinder 24, are progressively smaller and smaller, due to the fact that the displacement of the pumping means during successive cycles decreases by progressively smaller increments.

Ultimately, after a number of pumping cycles, equilibrium conditions are achieved and an equilibrium pressure is produced in the cylinder chamber 30, this equilibrium pressure being attained asymptotically by the addition of progressively smaller pressure increments. The axial position of the cylinder 24, relative to its initial axial position, when equilibrium conditions are achieved is indicative of the pressure being sensed, the cylinder displacement necessary to achieve equilibrium being a function of the pressure being measured. In the drawing, the maximum displacement of the cylinder 24 is designated by the symbol D.

The pressure sensing device 10 operates in accordance with the equation $$P = \left(\frac{F_0}{A}\right) \frac{1 - \frac{Kd}{F_0}}{\left(1 + \frac{d}{C}\right)^{1.4} - 1}$$

where P is the pressure being measured, $F_0$ is the force produced by the spring 38 prior to any displacement of the cylinder 24, A is the internal cross-sectional area of the cylinder 24, or the cross-sectional area of the piston 42, C is the linear clearance between the piston and the partition 34 when the piston is in its top dead center position, K is a constant, and d is the displacement of the cylinder 24 necessary to attain equilibrium.

The cylinder displacement d may be measured, i.e., sensed and indicated, in any suitable manner. In the particular construction illustrated, the cylinder 24 is shown as having connected thereto a rod 62 connected in turn to a movable contact of a potentiometer 64 mounted on the housing 12, the cylinder displacement being indicated by a meter 66 in an associated circuit 68. The resulting indication can be in any desired units, e.g., units of pressure, units of altitude, or the like. It will be understood that the sensing and indicating means illustrated is exemplary only and that other means may be used. For example, a mechanical linkage connected to a pointer, not shown, might be used.

In order to eliminate any tendency of the cylinder 24 to oscillate in response to reciprocatory motion of the piston 42 therein, a dashpot means 70 mounted on the housing 12 may be connected to the cylinder.

While not shown in the drawing, damping chambers and/or baffles, or equivalent means, may be incorporated in the structure of the static pressure chamber 14 to prevent the development of resonant conditions at the stroke frequency of the piston 42 from producing slight pressure differentials between the static pressure port 16 and the inlet port means 54. Also, making the volume of the static pressure chamber 14 large, particularly as compared to the volume $V_1$, tends to avoid any significant pressure differentials between the inlet port means 54 and the static pressure port 16.

It will be noted from the equation previously presented that the displacement d of the cylinder 24 is a function only of the pressure being measured and mechanical constants, i.e., of the pressure being measured and the physical characteristics of the pressure sensing device 10. Any structural variations due to temperature variations, mechanical stress variations, and the like, can have only transitory effects which are immediately cancelled out by gas flow into or out of the regions involved.

Although an exemplary embodiment of the invention has been described herein for purposes of illustration, it will be understood that various changes, modifications and substitutions may be incorporated in such embodiment without departing from the spirit of the invention as defined by the claims which follow.

What is claimed is:
1. In a device for sensing the pressure of a gas, the combination of:
 means providing a chamber the volume of which varies as a function of the pressure therein;
 variable displacement pumping means for pumping the gas into said chamber so as to progressively increase the volume thereof;
 means for progressively reducing the displacement of said pumping means as a function of the increasing volume of said chamber until an equilibrium pressure is attained in said chamber;
 and means for sensing the volume of said chamber.

2. In a device for sensing the pressure of a gas, the combination of:
 means providing a chamber the volume of which varies as a function of the pressure therein;
 variable displacement pumping means for pumping the gas into said chamber so as to progressively increase the volume thereof;
 means for incrementally reducing the displacement of said pumping means by progressively smaller increments as the volume of said chamber increases until an equilibrium pressure is attained in said chamber;
 and means for sensing the volume of said chamber.

3. In a device for sensing the pressure of a gas, the combination of:
 means providing a chamber the volume of which varies as a function of the pressure therein;
 variable displacement pumping means for pumping the gas into said chamber so as to progressively increase the volume thereof;
 means connected to said chamber and responsive to the increasing volume thereof for incrementally reducing the displacement of said pumping means by progressively smaller increments as the volume of said chamber increases until an equilibrium pressure is attained in said chamber;
 and means for sensing the volume of said chamber.

4. In a device for sensing the pressure of a gas, the combination of:
 a housing;
 a cylinder movable in said housing in the direction of its axis, said cylinder being closed at one end;
 a stationary partition in said cylinder and connected to said housing, said cylinder providing between said closed end thereof and said partition a chamber the volume of which increases in response to movement of said closed end of said cylinder in a direction away from said partition;
 yieldable means for biasing said cylinder in the opposite direction so as to resist increasing the volume of said chamber;
 a piston axially reciprocable in said cylinder on the opposite side of said partition from said chamber;
 means for axially reciprocating said piston in said cylinder;
 inlet port means in said cylinder on the side of said partition opposite said chamber and adapted to be covered by said piston as it approaches said partition;
 outlet port means connecting said chamber to said cylinder on the opposite side of said partition from said chamber;
 check valve means in said outlet port means and opening into said chamber;
 and means for sensing the axial position of said cylinder.

5. In a device for sensing the pressure of a gas, the combination of:
 a housing;
 a cylinder movable in said housing in the direction of its axis, said cylinder being closed at one end;
 a stationary partition in said cylinder and connected to said housing, said cylinder providing between said closed end thereof and said partition a chamber the volume of which increases in response to movement of said closed end of said cylinder in a direction away from said partition;
 yieldable means for biasing said cylinder in the opposite direction so as to resist increasing the volume of said chamber;
 a piston axially reciprocable in said cylinder on the opposite side of said partition from said chamber;
 means for axially reciprocating said piston in said cylinder;
 inlet port means in said cylinder on the side of said partition opposite said chamber and adapted to be covered by said piston as it approaches said partition;
 outlet port means in said partition and connecting said chamber to said cylinder on the opposite side of said partition from said chamber;
 and check valve means in said outlet port means and opening into said chamber.

6. In a device for sensing the pressure of a gas, the combination of:
 a housing;
 a cylinder movable in said housing in the direction of its axis, said cylinder being closed at one end;
 a stationary partition in said cylinder and connected to said housing, said cylinder providing between said closed end thereof and said partition a chamber the volume of which increases in response to movement of said closed end of said cylinder in a direction away from said partition;
 yieldable means for biasing said cylinder in the opposite direction so as to resist increasing the volume of said chamber;
 a piston axially reciprocable in said cylinder on the opposite side of said partition from said chamber;
 means for axially reciprocating said piston in said cylinder;
 inlet port means in said cylinder on the side of said partition opposite said chamber and adapted to be covered by said piston as it approaches said partition;
 outlet port means connecting said chamber to said cylinder on the opposite side of said partition from said chamber;
 check valve means in said outlet port means and opening into said chamber;
 means for sensing the axial position of said cylinder;
 and means on said piston for opening said check valve means as said piston approaches said partition.

7. In a device for sensing the pressure of a gas, the combination of:
 a housing;
 a cylinder movable in said housing in the direction of its axis, said cylinder being closed at one end;
 a stationary partition in said cylinder and connected to said housing, said cylinder providing between said closed end thereof and said partition a chamber the volume of which increases in response to movement of said closed end of said cylinder in a direction away from said partition;
 yieldable means for biasing said cylinder in the opposite direction so as to resist increasing the volume of said chamber;
 a piston axially reciprocable in said cylinder on the opposite side of said partition from said chamber;
 means for axially reciprocating said piston in said cylinder through a stroke of constant length;
 inlet port means in said cylinder on the side of said partition opposite said chamber and adapted to be covered by said piston as it approaches said partition;
 outlet port means connecting said chamber to said cylinder on the opposite side of said partition from said chamber;

check valve means in said outlet port means and opening into said chamber;

and means for sensing the axial position of said cylinder.

8. In a device for sensing the pressure of a gas, the combination of:

a housing;

a cylinder movable in said housing in the direction of its axis, said cylinder being closed at one end;

a stationary partition in said cylinder and connected to said housing, said cylinder providing between said closed end thereof and said partition a chamber the volume of which increases in response to movement of said closed end of said cylinder in a direction away from said partition;

yieldable means for biasing said cylinder in the opposite direction so as to resist increasing the volume of said chamber;

a piston axially reciprocable in said cylinder on the opposite side of said partition from said chamber;

crank means for axially reciprocating said piston in said cylinder through a stroke of constant length;

inlet port means in said cylinder on the side of said partition opposite said chamber and adapted to be covered by said piston as it approaches said partition;

outlet port means connecting said chamber to said cylinder on the opposite side of said partition from said chamber;

check valve means in said outlet port means and opening into said chamber;

and means for sensing the axial position of said cylinder.

9. In a device for sensing the pressure of a gas, the combination of:

a housing;

a cylinder movable in said housing in the direction of its axis, said cylinder being closed at one end;

a stationary partition in said cylinder and connected to said housing, said cylinder providing between said closed end thereof and said partition a chamber the volume of which increases in response to movement of said closed end of said cylinder in a direction away from said partition;

yieldable means for biasing said cylinder in the opposite direction so as to resist increasing the volume of said chamber;

a piston axially reciprocable in said cylinder on the opposite side of said partition from said chamber;

means for axially reciprocating said piston in said cylinder;

inlet port means in said cylinder on the side of said partition opposite said chamber and adapted to be covered by said piston as it approaches said partition;

outlet port means connecting said chamber to said cylinder on the opposite side of said partition from said chamber;

check valve means in said outlet port means and opening into said chamber;

means for sensing the axial position of said cylinder;

and a static pressure chamber in said housing and having a static pressure port exposed to the gas whose pressure is to be measured, said inlet port means communicating with said static pressure chamber, and the end of said cylinder opposite said closed end thereof communicating with said static pressure chamber.

10. In a device for sensing the pressure of a gas, the combination of:

a housing;

a cylinder movable in said housing in the direction of its axis, said cylinder being closed at one end;

a stationary partition in said cylinder and connected to said housing, said cylinder providing between said closed end thereof and said partition a chamber the volume of which increases in response to movement of said closed end of said cylinder in a direction away from said partition;

yieldable means for biasing said cylinder in the opposite direction so as to resist increasing the volume of said chamber;

a piston axially reciprocable in said cylinder on the opposite side of said partition from said chamber;

means for axially reciprocating said piston in said cylinder;

inlet port means in said cylinder on the side of said partition opposite said chamber and adapted to be covered by said piston as it approaches said partition;

outlet port means connecting said chamber to said cylinder on the opposite side of said partition from said chamber;

check valve means in said outlet port means and opening into said chamber;

means for sensing the axial position of said cylinder;

and a static pressure chamber in said housing and having a static pressure port exposed to the gas whose pressure is to be measured, said inlet port means communicating with said static pressure chamber, and the end of said cylinder opposite said closed end thereof communicating with said static pressure chamber, the volume of said static pressure chamber being large as compared to the maximum displacement of said piston.

11. In a device for sensing the pressure of a gas, the combination of:

a housing;

a cylinder movable in said housing in the direction of its axis, said cylinder being closed at one end;

a stationary partition in said cylinder and connected to said housing, said cylinder providing between said closed end thereof and said partition a chamber the volume of which increases in response to movement of said closed end of said cylinder in a direction away from said partition;

spring means interconnecting said cylinder and said housing for biasing said cylinder in the opposite direction so as to resist increasing the volume of said chamber;

a piston axially reciprocable in said cylinder on the opposite side of said partition from said chamber;

means for axially reciprocating said piston in said cylinder;

inlet port means in said cylinder on the side of said partition opposite said chamber and adapted to be covered by said piston as it approaches said partition;

outlet port means connecting said chamber to said cylinder on the opposite side of said partition from said chamber;

check valve means in said outlet port means and opening into said chamber;

and means for sensing the axial position of said cylinder.

12. In a device for sensing the pressure of a gas, the combination of:

a housing;

a cylinder movable in said housing in the direction of its axis, said cylinder being closed at one end;

a stationary partition in said cylinder and connected to said housing, said cylinder providing between said closed end thereof and said partition a chamber the volume of which increases in response to movement of said closed end of said cylinder in a direction away from said partition;

yieldable means for biasing said cylinder in the opposite direction so as to resist increasing the volume of said chamber;

a piston axially reciprocable in said cylinder on the opposite side of said partition from said chamber;

means for axially reciprocating said piston in said cylinder;
inlet port means in said cylinder on the side of said partition opposite said chamber and adapted to be covered by said piston as it approaches said partition;
outlet port means connecting said chamber to said cylinder on the opposite side of said partition from said chamber;
check valve means in said outlet port means and opening into said chamber;
means for sensing the axial position of said cylinder;
and dashpot means connected to said cylinder for preventing any axial oscillations of said cylinder which said piston may tend to excite as it reciprocates in said cylinder.

13. In a device for sensing the pressure of a gas, the combination of:
a closed chamber;
variable displacement pumping means for pumping said gas into said closed chamber to progressively increase the pressure of said gas in said closed chamber;
means for progressively reducing the displacement of said pumping means as a function of the increasing pressure of said gas in said closed chamber so as to increase the pressure of said gas in said closed chamber to an equilibrium pressure asymptotically by progressively smaller increments;
and means for sensing said equilibrium pressure.

References Cited in the file of this patent

UNITED STATES PATENTS

| | | |
|---|---|---|
| 2,012,511 | Hubbard | Aug. 27, 1935 |
| 2,646,682 | Ovtschinnikoff | July 28, 1953 |